United States Patent [19]

Oda et al.

[11] Patent Number: 4,806,906
[45] Date of Patent: Feb. 21, 1989

[54] DATA TERMINAL

[75] Inventors: Takashi Oda, Tokyo; Masayoshi Yamashita, Saitama, both of Japan

[73] Assignee: NEC Corporation, Tokyo, Japan

[21] Appl. No.: 8,681

[22] Filed: Jan. 29, 1987

[30] Foreign Application Priority Data

Jan. 29, 1986 [JP] Japan .................... 61-12110[U]

[51] Int. Cl.$^4$ .................................... H04Q 1/00
[52] U.S. Cl. ........................ 340/311.1; 340/825.44; 364/709.01
[58] Field of Search ............ 364/705, 708, 709; 455/280, 290, 292, 296, 310, 351, 346, 348; 340/825.44–825.48, 875.4, 875.41, 311.1; 343/702, 841, 848

[56] References Cited

U.S. PATENT DOCUMENTS

| 2,790,899 | 4/1957 | Townsend | 455/351 X |
| 3,230,533 | 6/1966 | Brill | 455/346 X |
| 3,518,681 | 6/1970 | Kiepe | 455/292 X |
| 3,720,874 | 3/1973 | Gorcik et al. | 343/841 X |
| 3,816,836 | 6/1974 | Smith | 343/841 X |
| 3,976,995 | 8/1976 | Sebestyen | 455/351 X |
| 4,286,335 | 8/1981 | Eichler et al. | 455/346 X |

FOREIGN PATENT DOCUMENTS 0023289 2/1981 European Pat. Off. ............ 455/346

Primary Examiner—Ulysses Weldon
Attorney, Agent, or Firm—Sughrue, Mion, Zinn, Macpeak, & Seas

[57] ABSTRACT

A data terminal usable with a paging receiver mounted thereon is disclosed. The data terminal includes a whip antenna and a resonance circuit which is connected to the whip antenna. The ground of the resonance circuit is connected to the ground of circuitry mounted in the data terminal, so that the ground of the latter serves as a reflector of the whip antenna to enhance the antenna gain as well as the receive sensitivity. The antenna of the receiver is sufficiently remote from a clock oscillating section for a CPU which is installed in the data terminal, whereby clock noise generated by the clock oscillating section is prevented from deteriorating the receive sensitivity.

4 Claims, 2 Drawing Sheets

DATA TERMINAL

BACKGROUND OF THE INVENTION

The present invention relates to a data terminal and, more particularly, to a data terminal which is usable with a paging receiver mounted thereon.

A paging receiver capable of receiving messages and information is known in the communications art. This type of receiver may be connected to a data terminal having a standard communication interface or a printer mechanism in order to print out a message or information as received by the receiver.

Generally, an antenna is built in such a paging receiver and used in an upright position so that it may be oriented perpendicularly to an antenna of a transmit station. This is because the electromagnetic wave from the antenna of the transmit station is a horizontally polarized wave with respect to a magnetic field and, therefore, the receive sensitivity of the receiver antenna cannot be enhanced unless the receiver antenna is used in such an orientation as to traverse the magnetic flux of the horizontally polarized wave. However, when the paging receiver is mounted on the data terminal, the only position of the receiver available is such that the receiver antenna is oriented horizontally. This deteriorates the receive sensitivity of the receiver antenna to a critical extent in practical use.

Another problem is that the receiver antenna is affected by noise of a clock adapted to clock a central processing unit (CPU) which is installed in the data terminal, further aggravating the receive sensitivity of the antenna.

SUMMARY OF THE INVENTION

It is therefore an object of the present invention to provide a data terminal which allows an antenna of a paging receiver mounted thereon to achieve a high gain and high receive sensitivity.

It is another object of the present invention to provide a generally improved data terminal.

A data terminal of the present invention comprises a whip antenna, a resonance circuit connected to the whip antenna, and a receiver accommodating portion for accommodating a paging receiver such that an antenna built in the receiver is coupled with the resonance circuit. A ground of the resonance circuit and a ground of circuitry which is mounted in the data terminal are joined with each other. In this construction, the ground of the circuitry serves as a reflector of the whip antenna to enhance the antenna gain as well as the receive sensitivity. The antenna of the receiver is sufficiently remote from a clock oscillating section for a CPU which is installed in the data terminal, whereby clock noise generated by the clock oscillating section is prevented from deteriorating the receive sensitivity.

The above and other objects, features and advantages of the present invention will become more apparent from the following detailed description taken with the accompanying drawings.

DESCRIPTION OF THE PREFERRED EMBODIMENT

To better understand the present invention, a brief reference will be made to a paging receiver in relation to a prior art data terminal, shown in FIG. 1.

Figure 1:
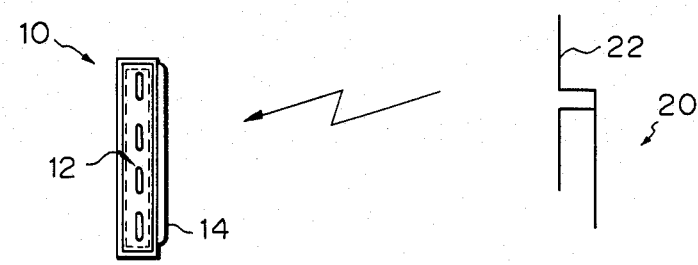
FIG. 1 is a schematic view showing a paging receiver in a usual position for use.
Figure 4:
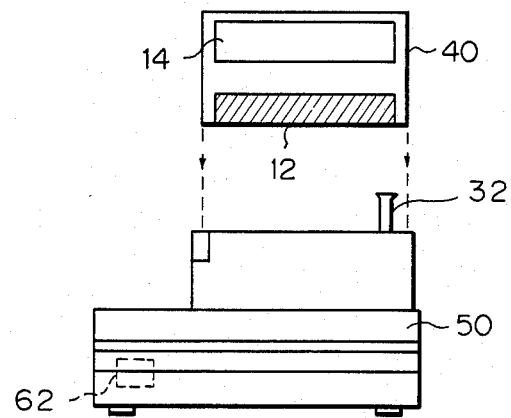
FIG. 4 is a front view of the data terminal of FIG. 2.

As shown in FIG. 1, a paging receiver 10 includes an antenna 12 which is used in a perpendicular position to an antenna 22 which is located at a transmitting side 20, for the reason as previously stated. Specifically, the electromagnetic wave from the antenna 22 of the transmitting side 20 is a horizontally polarized wave with respect to a magnetic field so that the receive sensitivity of the antenna 12 cannot be enhanced unless the antenna 12 is used in such a manner as to traverse the magnetic flux of the horizontally polarized wave. In FIG. 1 the reference numeral 14 designates a display for displaying a received message for information. A problem is that when the receiver 10 is mounted on a data terminal, the only position available is such that the receiver antenna 12 is oriented horizontally, as shown in FIG. 4. This degrades the receive sensitivity of the receiver antenna 12 to a critical extent.

Figure 2:
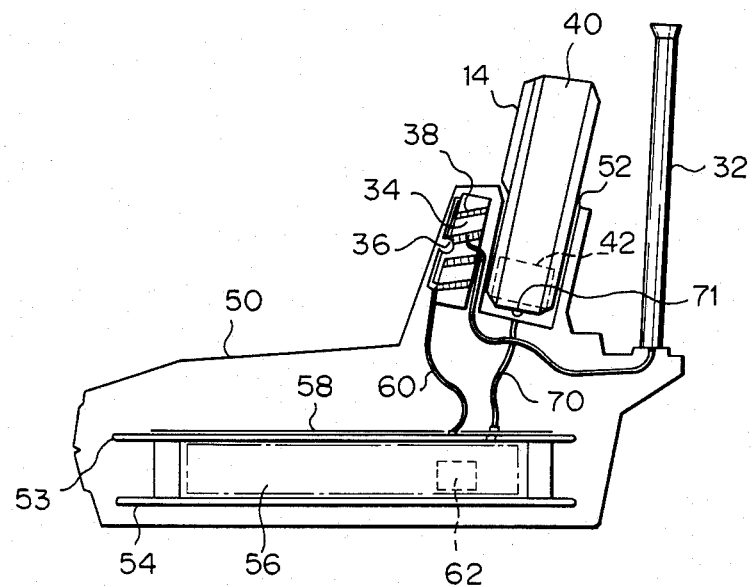
FIG. 2 is a partly sectional side elevation of a data terminal embodying the present invention.
Figure 3:
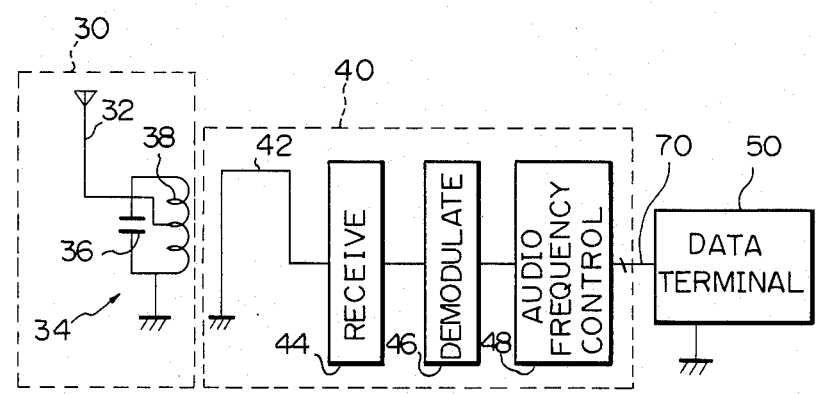
FIG. 3 is a block diagram schematically showing a circuit arrangement of the data terminal as shown in FIG. 2.

Referring to FIGS. 2 to 4, a data terminal embodying the present invention is shown which constitutes a solution to the above-described problems. The data terminal, generally 50, includes a whip antenna 32 which is located in a particular position as shown in FIG. 2. The whip antenna 32 is connected to a resonance circuit 34 which is made up of a capacitor 36 and a coil 38. As shown in FIG. 3, the whip antenna 32 and resonance circuit 34 in combination serve as an external antenna section 30. A påging receiver 40 is provided with an antenna 42 thereinside, while the data terminal 50 is provided with a socket, or receiver accommodating section, 52 for accommodating the receiver 40 thereinside. The socket 52 is positioned such that the receiver 40 put in the socket 52 causes its antenna 42 to be coupled with the resonance circuit 34 of the receiver 50 with respect to a magnetic field. Data is interchanged between the receiver 40 and the data terminal 50 through a contact 71 and a connecting line 70, FIG. 3.

The whip antenna 32 seizes a desired electromagnetic wave to cause the resonance circuit 34 to produce an induced current. This induced current causes the coil 38 to develop a magnetic flux which in turn induces a current in the antenna 42 of the receiver 40. The current induced in the antenna 42 is fed as a signal current to a receiving section (RECEIVE) 44 as shown in FIG. 3, whereby it is subjected to various kinds of processing such as amplification and frequency conversion. The output signal of the receiving section 44 is demodulated by a demodulating section (DEMODULATE) 46 with the result that it becomes a signal whose frequency lies in an audio frequency band. The demodulated signal is delivered to an audio frequency control section (AUDIO FREQUENCY CONTROL) 48 and therefrom to the data terminal via the line 70.

As shown in FIG. 2, the data terminal 50 is provided with two printed circuit boards 53 and 54 on which parts 56 are mounted. A ground pattern 58 provided on the board 53 is connected to the ground of the resonance circuit 34 by a connecting line 60. A clock oscillating section 62 for clocking a CPU is installed in a particular position of the data terminal, as shown in FIGS. 2 and 4. The socket 52 of the data terminal 50 is positioned sufficiently remotely from the clock oscillator section 62 so that the clock may not influence the antenna 42 of the receiver 40. In addition, the socket 52 is so positioned as not to affect the attractive appearance of the data terminal.

The whip antenna 32 of the external antenna section 30 achieves a higher antenna gain then a loop antenna and others since, as previously stated, the polarized wave from the transmit station is a horizontally polarized wave with respect to an electric field. The antenna gain is further enhanced by the fact that the ground pattern 58 connected to the ground of the resonance circuit 34 plays the role of a reflector of the whip antenna 32. If desired, the inductance of the coil 38 of the circuit 34 may be increased within a tunable range in order to increase the magnetic flux which intersects the receiver antenna 42 and, thereby, the antenna gain. Because the antenna 42 and the clock oscillating section 62 are arranged as remote from each other as possible, there is only a minimum of probability for the antenna 42 to pick up clock noise. Such offers an extra improvement in the receive sensitivity of the antenna 42.

In summary, it will be seen that the present invention provides a data terminal which enhances the receive sensitivity of an antenna of paging receiver by using a whip antenna and connecting the ground of a resonance circuit of the terminal to the ground pattern of circuitry which is mounted in the terminal, the ground pattern serving as a reflector of the whip antenna. The receive sensitivity is further enhanced because the data terminal frees the receiver antenna from the influence of clock noise.

Various modifications will become possible for those skilled in the art after receiving the teachings of the present disclosure without departing from the scope thereof.

What is claimed is:

1. A data terminal for receiving data from a paging receiver, said data terminal comprising:
   a plurality of circuit elements, including a ground therefor;
   a whip antenna attached to said data terminal;
   a resonance circuit connected to said whip antenna and having a ground; and
   a receiver accommodating portion for accommodating said paging receiver such that an antenna built in said paging receiver is coupled with said resonance circuit;
   said ground of said resonance circuit and said ground of said circuit elements which are mounted in said data terminal being joined with each other so that said ground of said circuit elements serves as a reflector of said whip antenna.

2. A data terminal as claimed in claim 1, further including a clock oscillating section, wherein said receiver accommodating portion is located sufficiently remotely from a clock oscillating section of said data terminal to prevent noise from said clock oscillating section from influencing said antenna which is built in said receiver.

3. A data terminal comprising:
   means for accommodating a paging receiver;
   means for receiving data from said paging receiver;
   whip antenna means attached to said data terminal; and
   resonance circuit means built in said data terminal, connected to said whip antenna means and positioned so as to be inductively coupled to an inner antenna of said paging receiver when said paging receiver is positioned within said accommodating means, a ground of said resonance circuit means and a ground pattern of said data terminal being connected to each other so that said ground pattern serves as a reflector of said whip antenna means.

4. A method of transferring data from a paging receiver to a data terminal, comprising the steps of:
   attaching a whip antenna to said data terminal;
   connecting said whip antenna to a resonance circuit built in said data terminal;
   connecting a ground of said resonance circuit to a ground pattern of said data terminal so that said ground pattern serves as a reflector of said whip antenna;
   accommodating said paging receiver in said data terminal so that said resonance circuit is inductively coupled to an inner antenna of said paging receiver; and
   sending data from said paging receiver to said data terminal via data contacts.

* * * * *

UNITED STATES PATENT AND TRADEMARK OFFICE
CERTIFICATE OF CORRECTION

PATENT NO. : 4,806,906

DATED : February 21, 1989

INVENTOR(S) : Takashi ODA et al

It is certified that error appears in the above-identified patent and that said Letters Patent is hereby corrected as shown below:

COLUMN 2, LINE 43  Delete "receiver 50" and insert

-- receiver 40 --.

Signed and Sealed this

Twelfth Day of December, 1989

*Attest:*

JEFFREY M. SAMUELS

*Attesting Officer*  Acting Commissioner of Patents and Trademarks